United States Patent
Yamamoto et al.

(10) Patent No.: US 6,198,867 B1
(45) Date of Patent: Mar. 6, 2001

(54) RADIATION-CURABLE LIQUID RESIN COMPOSITION AND OPTICAL FIBER

(75) Inventors: Akira Yamamoto, Gunma-ken; Shouhei Kozakai, Annaka; Satoshi Iwasaki, Gunma-ken, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/339,167

(22) Filed: Jun. 24, 1999

(30) Foreign Application Priority Data

Jul. 8, 1998 (JP) .................................. 10-208656

(51) Int. Cl.[7] .................. G02B 6/02; C08F 2/46
(52) U.S. Cl. ................. 385/128; 385/123; 385/141; 427/487; 427/489; 427/163.2
(58) Field of Search .................... 385/123, 127, 385/128, 141, 145; 427/487, 489, 493, 515, 516, 163.2; 65/432

(56) References Cited

U.S. PATENT DOCUMENTS

| | | | |
|---|---|---|---|
| Re. 33,737 | * 11/1991 | Hida et al. ............................ | 385/141 |
| 4,496,210 | 1/1985 | Ansel et al. ...................... | 385/141 X |
| 4,571,349 | * 2/1986 | Hockemeyer et al. ............. | 427/54.1 |
| 4,733,942 | * 3/1988 | Hida et al. ..................... | 427/163.2 X |
| 4,743,474 | * 5/1988 | Homan ................................. | 427/387 |
| 4,908,274 | * 3/1990 | Jachmann et al. ................... | 428/452 |
| 4,972,005 | 11/1990 | Aoki et al. ............................ | 522/99 |

FOREIGN PATENT DOCUMENTS

| | | | |
|---|---|---|---|
| 61-21121 | 1/1986 | (JP) | ................................. 385/141 X |
| 2429619 | 5/1992 | (JP) | ................................. 385/141 X |
| 22522663 | 5/1996 | (JP) | ................................. 385/141 X |
| 22547021 | 8/1996 | (JP) | ................................. 385/141 X |

OTHER PUBLICATIONS

XP002117870, Chemical Abstracts, vol. 106, No. 20, May 18, 1987, Columbus, OH, Abstract No. 157609.

* cited by examiner

Primary Examiner—Brian Healy

(57) ABSTRACT

A radiation-curable liquid resin composition contains (A) an organopolysiloxane having a (meth)acryl group at either end of its molecular chain, containing at least 15 mol % of aromatic hydrocarbon groups based on the entire organic groups, and being free of a urethane bond, (B) a compound having at least one ethylenically unsaturated group in a molecule, and (C) a photopolymerization catalyst. The composition has a low viscosity and cures into a product having a low Young's modulus and experiencing a less change of Young's modulus at low temperatures. The composition is useful as a primary coating for optical fibers.

6 Claims, No Drawings

RADIATION-CURABLE LIQUID RESIN COMPOSITION AND OPTICAL FIBER

This invention relates to a radiation-curable liquid resin composition which has a low viscosity and cures into a product having a low Young's modulus and suitable as a primary coating or buffer layer on optical fibers. It also relates to an optical fiber covered with a cured product of the composition.

BACKGROUND OF THE INVENTION

Optical fibers for data communication include a variety of fibers such as quartz glass, multi-component glass and plastic fibers. In practice, because of their light weight, low loss, durability, and high transmission capacity, quartz glass optical fibers are vastly used in a wide range of application. Since the quartz glass optical fibers, however, are very thin and susceptible to changes by external factors, quartz glass fibers as melt spun are generally provided with a primary coating and then with a secondary coating for protecting the primary coating. The primary coating is formed by applying a liquid curable resin of the type giving a soft cured product, followed by curing. The secondary coating is formed by applying a liquid curable resin of the type giving a hard cured product, followed by curing.

Properties required for the primary coating material include a low Young's modulus and low temperature dependency thereof for preventing microbending losses by external stresses or temperature changes, durability in terms of heat resistance and water resistance, low water absorption, low hydrogen generation, a high refractive index, and a fast-curing ability and low viscosity for allowing the drawing speed of optical fibers to be increased for improved productivity. To meet these requirements, UV-curable compositions based on urethane acrylate were proposed in the past. For example, JP-B 1-19694 and Japanese Patent Nos. 2,522,663 and 2,547,021 disclose liquid UV-curable compositions comprising a urethane acrylate oligomer, a reactive monomer, and a polymerization initiator. These compositions, however, fail to meet some of the above requirements, that is, a low Young's modulus and good low-temperature properties (minimized temperature dependency of Young's modulus), low water absorption, and low viscosity, because they are based on urethane acrylate oligomers of urethane bond-bearing polyethers or polyesters.

For reducing Young's modulus and improving low-temperature properties, JP-B 4-29619 corresponding to U.S. Pat. No. 4,496,210 and JP-A 61-21121 disclose liquid UV-curable compositions using a silicone urethane acrylate containing an organic polysiloxane. Urethane bonds are contained likewise. Because of the structural factors of urethane bonds (specifically, rigidity of the structure and the hydrogen bond in the urethane bond), these compositions are not satisfactory to some of the above requirements, that is, a low Young's modulus and a low viscosity. The embodiments described in these patents suggest that the organic polysiloxane is limited to a dimethylsiloxane skeleton, which has a low refractive index and is less compatible with reactive monomers. It is then difficult to design a liquid UV-curable composition capable of satisfying the required values.

SUMMARY OF THE INVENTION

An object of the invention is to provide a low-viscosity radiation-curable liquid resin composition which cures into a product having a low Young's modulus and experiencing a less change of Young's modulus at low temperature. Another object of the invention is to provide an optical fiber coated with a cured product of this composition.

The invention addresses a radiation-curable liquid resin composition comprising a (meth)acryl group-bearing oligomer or polymer as a main component. The inventor has found that an organopolysiloxane having a (meth)acryl group at each end of its molecular chain, containing at least 15 mol % of aromatic hydrocarbon groups based on the entire organic groups attached to silicon atoms, and being free of a urethane bond within the molecule is fully compatible with a reactive monomer and when it is used as the main component, the resulting radiation-curable liquid resin composition has a low viscosity and cures into a product having a low Young's modulus and a high refractive index. Especially when a monomer based on an organosiloxane skeleton and having an ethylenically unsaturated group is used as the reactive monomer, the cured product experiences a minimal change of Young's modulus at low temperatures.

The invention provides a radiation-curable liquid resin composition comprising (A) an organopolysiloxane having a (meth)acryl group at either end of its molecular chain, containing at least 15 mol % of aromatic hydrocarbon groups based on the entire organic groups attached to silicon atoms, and being free of a urethane bond within the molecule, (B) a compound having at least one ethylenically unsaturated group in a molecule, and (C) a photopolymerization catalyst.

This composition is effective for the coating of optical fibers. Therefore, an optical fiber covered with a cured product of the composition is also contemplated herein.

DESCRIPTION OF THE PREFERRED EMBODIMENTS (A) Urethane Bond-free, (meth)Acryl Group-bearing Organopolysiloxane The first component of the radiation-curable liquid resin composition according to the invention is an organopolysiloxane which has a (meth)acryl group at either end of its molecular chain, contains at least 15 mol % of aromatic hydrocarbon groups based on the entire organic substituents attached to silicon atoms, and is free of a urethane bond within the molecule; especially a linear diorganopolysiloxane containing at least 15 mol % of aromatic hydrocarbon groups based on the entire organic substituents (that is, substituted or unsubstituted monovalent hydrocarbon groups) attached to silicon atoms, excluding the (meth)acryl group-bearing organic groups attached to the silicon atoms at both ends of the molecular chain. In the specification, (meth)acryl group means acryl group and/or methacryl group.

This organopolysiloxane is the base polymer of the liquid resin composition according to the invention and is basically a linear diorganopolysiloxane whose backbone consists of recurring diorganosiloxane units. The number of silicon atoms in the molecule (or the degree of the polymerization) is generally about 80 to about 1,200, preferably about 100 to about 1,000. Preferably the (meth)acryl group is attached to the silicon atom at each end of the molecular chain as a (meth)acryloxyalkyl group.

Typically, the organopolysiloxane is represented by the following general formula (1).

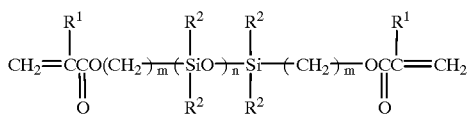
(1)

Herein $R^1$ is a hydrogen atom or a methyl group, $R^2$, which may be the same or different, is a substituted or unsubstituted monovalent hydrocarbon group having 1 to 10 carbon atoms, $R^2$ contains at least 15 mol % of aromatic hydrocarbon groups, m is an integer of 1 to 5, and n is an integer of 80 to 1,200, and preferably 100 to 1,000.

Formula (1) is described in detail. $R^1$ is a hydrogen atom or a methyl group, although the hydrogen atom is preferred when the curing rate of the composition upon exposure to radiation is taken into account. $R^2$ represents substituted or unsubstituted monovalent hydrocarbon groups having 1 to 10 carbon atoms, preferably substituted or unsubstituted monovalent hydrocarbon group having no aliphatic unsaturated bonds, for example, straight, branched or cyclic alkyl groups of 1 to 10 carbon atoms, especially 1 to 6 carbon atoms, aryl groups of 6 to 10 carbon atoms, and aralkyl groups of 7 to 10 carbon atoms. Exemplary groups of $R^2$ are alkyl groups such as methyl, ethyl, propyl, isopropyl, butyl, isobutyl, tert-butyl, pentyl, hexyl, cyclohexyl, octyl, nonyl and decyl; aryl groups such as phenyl, tolyl, xylyl, and ethylphenyl; aralkyl groups such as benzyl, β-phenylethyl, and α-methyl-β-phenylethyl; and substituted ones of these groups wherein some of the hydrogen atoms are replaced by halogen atoms (e.g., F, Cl and Br), typically halo-substituted alkyl groups such as chloromethyl, bromoethyl, and 3,3,3-trifluoropropyl. Methyl and phenyl groups are preferable from the commercial aspect. For increasing the refractive index of the inventive composition, it is desired to increase the compatibility of the organopolysiloxane (A) with the monomer having at least one ethylenically unsaturated bond in a molecule (B) as the second component of the composition, especially an acrylic compound. To this end, aromatic hydrocarbon groups are contained in an amount of at least 15 mol %, typically 15 to 50 mol %, especially 15 to 30 mol %, based on the $R^2$ groups. Exemplary aromatic hydrocarbon groups are aryl groups such as phenyl, tolyl, xylyl, and ethylphenyl, and aralkyl groups such as benzyl, β-phenylethyl, and α-methyl-β-phenylethyl, with the aryl groups such as phenyl being preferred. Letter m is an integer of 1 to 5, especially 1 to 3.

The organopolysiloxane (A) preferably has a degree of polymerization (n) of about 80 to about 1,200, especially about 100 to about 1,000. With n of less than 80, the cured product of the composition has a high Young's modulus and a low elongation. With n of more than 1,200, the composition has a high viscosity and the organopolysiloxane becomes less compatible with the monomer (B). Most preferably, the degree of polymerization (n) is in the range of about 150 to about 500.

The organopolysiloxanes (A) can be synthesized by well-known acid equilibration reaction. More particularly, they are synthesized through acid equilibration reaction between a hexaorganodisiloxane having a (meth)acryl group with various cyclic polysiloxanes. Of these disiloxanes, bis(acryloxymethyl)-tetramethyldisiloxane is preferable for ease of synthesis. Of the cyclic polysiloxanes, octamethylcyclotetrasiloxane, hexamethylcyclotrisiloxane, 1,1-diphenyl-3,3,5,5-tetramethylcyclotrisiloxane, and 1-phenyl-1,2,2,3,3-pentamethylcyclotrisiloxane are used for ease of acid equilibration reaction.

(B) Ethylenically Unsaturated Group-bearing Compound

Component (B) of the inventive composition is a compound having at least one ethylenically unsaturated group in a molecule. Component (B) has a function that it allows the composition to crosslink or cure by reacting with the (meth)acryl group-bearing organopolysiloxane of component (A), and thus is a component which is often referred to a reactive monomer or reactive diluent. Illustrative are N-vinyl compounds and compounds of the structure wherein (meth)acrylic acid is attached to compounds having an amino or hydroxyl group by amidation reaction or esterification reaction. For example, the following monofunctional, difunctional and polyfunctional compounds can be used.

Monofunctional compounds:

Exemplary N-vinyl compounds are N-vinylpyrrolidone, N-vinylcaprolactam, N-vinylacetamide, and N-vinylformamide. Exemplary compounds of the structure wherein (meth)acrylic acid is attached to compounds having an amino or hydroxyl group by amidation reaction or esterification reaction are methoxyethylene glycol (meth)acrylate, methoxypolyethylene glycol (meth)acrylate, nonylphenoxyethyl (meth)acrylate, nonylphenoxypolyethylene glycol (meth)acrylate, nonylphenoxypolypropylene glycol (meth)acrylate, 3-chloro-2-hydroxypropyl (meth)acrylate, phenoxyethyl (meth)acrylate, phenoxypolypropylene glycol (meth)acrylate, butoxypolyethylene glycol (meth)acrylate, alkyl (meth)acrylates, cyclohexyl (meth)acrylate, tetrahydrofurfuryl (meth)acrylate, isobornyl (meth)acrylate, benzyl (meth)acrylate, cumylphenol (meth)acrylate, cumylphenoxypolyethylene glycol (meth)acrylate, cumylphenoxypolypropylene glycol (meth)acrylate, 2-hydroxypropyl (meth)acrylate, 2-ethylhexyl (meth)acrylate, dicyclopentadiene (meth)acrylate, 2-hydroxy-3-phenoxypropyl (meth)acrylate, 2-(meth)acryloyloxyethyl-2-hydroxyethylphthalic acid, 3-acryloyloxyglycerin mono(meth)acrylate, 2-hydroxybutyl (meth)acrylate, 2-hydroxy-1-(meth)acryloxy-3-(meth)acryloxypropane, polypropylene glycol mono(meth)acrylate, polyethylene glycol mono(meth)acrylate, poly-ε-caprolactone mono(meth)acrylate, dialkylaminoethyl (meth)acrylates, glycidyl (meth)acrylate, mono[2-(meth)acryloyloxyethyl]-acid phosphate, trichloroethyl (meth)acrylate, 2,2,3,3-tetrafluoropropyl (meth)acrylate, 2,2,3,4,4,4-hexafluorobutyl (meth)acrylate, perfluorooctylethyl (meth)acrylate, dicyclopentenyl (meth)acrylate, dicyclopentenyloxyalkyl (meth)acrylates, tricyclodecanyl (meth)acrylate, tricyclodecanyloxyethyl (meth)acrylate, tricyclodecanyloxyethyl (meth)acrylate, isobornyloxyethyl (meth)acrylate, and morpholine (meth)acrylate.

As the monofunctional compound having an ethylenically unsaturated group, an acrylate compound containing a straight or branched organosiloxane skeleton (that is, organic silicon compound) represented by the following general formula (2) may be used. The use of this acrylate compound is desirable because of the reduced change of Young's modulus at low temperatures.

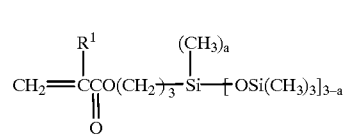
(2)

Herein $R^1$ is a hydrogen atom or a methyl group, and a is equal to 0 or 1. Although $R^1$ is a hydrogen atom or a methyl group, the hydrogen atom is preferred when the curing rate of the composition upon exposure to radiation is taken into account.

Difunctional compounds:

Exemplary difunctional compounds are di(meth)acrylate of 2,2-dimethyl-3-hydroxypropyl-2,2-dimethyl-3-hydroxypropionate, ethylene glycol di(meth)acrylate, tetraethylene glycol di(meth)acrylate, polyethylene glycol di(meth)acrylate, propylene glycol di(meth)acrylate, polypropylene glycol di(meth)acrylate, 1,4-butanediol di(meth)acrylate, 1,6-hexanediol di(meth)acrylate, glycol di(meth)acrylate, neopentyl glycerin di(meth)acrylate, di(meth)acrylate of ethylene oxide adduct of bisphenol A, di(meth)acrylate of propylene oxide adduct of bisphenol A, 2,2'-di(hydroxyethoxyphenyl)propane di(meth)acrylate, tricyclodecane dimethylol di(meth)acrylate, dicyclopentadiene di(meth)acrylate, pentane di(meth)acrylate, and (meth) acrylic acid adduct of 2,2-bis(glycidyloxyphenyl)propane.

Polyfunctional compounds:

Exemplary polyfunctional compounds are trimethylolpropane tri(meth)acrylate, trimethylolpropane trioxyethyl (meth)acrylate, pentaerythritol tetra(meth)acrylate, dipentaerythritol hexa(meth)acrylate, tris(acryloxymethyl) isocyanurate, tris(acryloxyethyl) isocyanurate, tris-(acryloxypropyl) isocyanurate, triallyl trimellitic acid, and triallyl isocyanurate.

Of these, the monofunctional compounds are preferred since the composition of the invention is especially suited as the low Young's modulus primary coating on optical fibers.

The amount of the compound having at least one ethylenically unsaturated group in a molecule (B) blended is determined in accordance with the type of (meth)acryl group-bearing organopolysiloxane (A) and compound (B), the desired viscosity of the resin composition, and the desired physical properties of a cured product thereof. For example, a choice may be made in the range of about 5 to 200 parts, preferably about 10 to 150 parts, more preferably about 20 to 100 parts by weight per 100 parts by weight of (meth)acryl group-bearing organopolysiloxane (A).

(C) Photopolymerization Initiator

Any of well-known photopolymerization initiators may be used. Examples include 1-hydroxycyclohexyl phenyl ketone, 2,2-dimethoxy-2-phenylacetophenone, phenylacetophenone diethyl ketal, alkoxyacetophenones, benzyl methyl ketal, benzophenone and benzophenone derivatives such as 3,3-dimethyl-4-methoxybenzophenone, 4,4-dimethoxy-benzophenone, and 4,4-diaminobenzophenone, alkyl benzoylbenzoates, bis(4-dialkylaminophenyl)ketones, benzyl and benzyl derivatives such as benzyl methyl ketal, benzoyl and benzoin derivatives such as benzoin butyl methyl ketal, benzoin isopropyl ether, 2-hydroxy-2-methylpropiophenone, thioxanthone derivatives such as 2,4-diethylthioxanthone and 2,4-dichlorothioxanthone, fluorene, 2-methyl-1-[4-(methylthio)phenyl]-2-morpholinopropane-1,2-benzyl-2-dimethylamino-1-(morpholinophenyl)-butanone-1, and phosphine oxide derivatives such as 2,4,6-trimethyl-benzoyldiphenylphosphine oxide and bis(2,6-dimethoxy-benzoyl)-2,4,4-trimethylpentylphosphine oxide.

Of these photopolymerization initiators, the phosphine oxide derivatives are preferred for fast curing. The initiators may be used alone or in admixture of two or more. The amount of the initiator used is usually about 0.01 to 15 parts, preferably about 0.1 to 10 parts by weight per 100 parts by weight of components (A) and (B) combined.

In the resin composition of the invention, various additives, for example, stabilizers such as antioxidants and UV absorbers, organic solvents, plasticizers, surfactants, silane coupling agents, titanium coupling agent, coloring pigments, and organic or inorganic particles may be used if desired and insofar as the objects of the invention are not impaired.

The resin composition of the invention is prepared by blending the above-described components and agitating and mixing them. The composition is preferably adjusted to a viscosity of about 500 to about 10,000 centipoise at 25° C. from the working standpoint for adapting itself to usual manufacturing conditions of optical fiber cores and especially about 500 to about 4,000 centipoise at 25° C. for adapting itself to high-speed manufacturing conditions.

Like conventional UV-curable compositions, the liquid resin composition of the invention cures upon exposure to radiation, typically UV. The thus cured coating should desirably have a Young's modulus of up to 0.1 kgf/mm$^2$ in order to protect cores from microbending by external forces and temperature changes. The type of radiation with which the inventive composition is curable includes IR, visible rays, and UV as well as ionizing radiation such as x-rays, electron beams, $\alpha$-rays, $\beta$-rays and $\gamma$-rays.

The radiation-curable liquid resin composition of the invention is not only useful as optical fiber coatings, but also finds many other applications, for example, as mold release coatings, water-repellent coatings, protective coatings, various types of ink and paint.

The radiation-curable liquid resin composition of the invention is especially useful as a primary coating on optical fibers. It is directly applied to optical glass fibers to form a primary coating, over which a secondary coating having a high Young's modulus is applied. The secondary coating is typically a urethane acrylate composition which is a UV-curable resin composition. The composition of the invention is also applicable as a buffer or filler for waterproof fiber cables and submarine cable optical fiber units.

EXAMPLE

Examples of the invention are given below by way of illustration and not by way of limitation. All parts are by weight.

Synthesis Example 1

Synthesis of Acryl Group-bearing Organopolysiloxane (A)

A reactor was charged with 100 parts of 1,3-bis (acryloxymethyl)-tetramethyldisiloxane, 1,960 parts of octamethylcyclotetrasiloxane, and 4,582 parts of 1,1-diphenyl-3,3,5,5-tetramethylcyclotrisiloxane. At 60° C. , 7 parts of trifluoromethanesulfonic acid was added and equilibration reaction effected for 24 hours. The reaction mixture was neutralized with sodium bicarbonate, treated with activated carbon, and filtered. Volatiles were distilled off at 150° C. and 5 mmHg, yielding acryl group-bearing organopolysiloxane (A) as shown below. It had a viscosity of 6,610 centipoise at 25° C. and a refractive index of 1.4835.

Acryl-bearing organopolysiloxane (A):

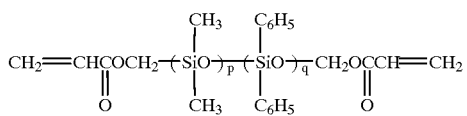

It is noted that

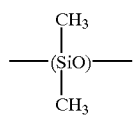

units and

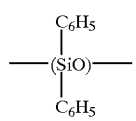

units are randomly distributed in the molecular chain.

Synthesis Example 2

Synthesis of Acryl Group-bearing Organopolysiloxane (B)

An acryl group-bearing organopolysiloxane (B) as shown below was synthesized as in Synthesis Example 1, but using 100 parts of 1,3-bis(acryloxymethyl)-tetramethyldisiloxane, 3,430 parts of octamethylcyclotetrasiloxane, 2,291 parts of 1,1-diphenyl-3,3,5,5-tetramethylcyclotrisiloxane, and 6 parts of trifluoromethanesulfonic acid. It had a viscosity of 2,150 centipoise at 25° C. and a refractive index of 1.4448.

Acryl-bearing organopolysiloxane (B):

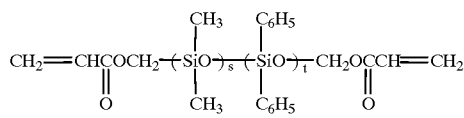

It is noted that

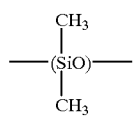

units and

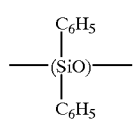

units are randomly distributed in the molecular chain.

Synthesis of Organosiloxane Compound (C) (a compound having an organosiloxane skeleton and containing an ethylenically unsaturated group)

A reactor was charged with 652 parts of water, 327 parts of isopropyl alcohol and 47 parts of 36% hydrochloric acid and cooled below 5° C. To this mixture, a mixture of 218 parts of acryloxypropylmethyldimethoxysilane and 434 parts of trimethylchlorosilane w as added dropwise while maintaining the reaction solution below 15° C. After the completion of addition, the reaction solution was stirred for 2 hours. The upper layer was separated off. The solution was then washed with water, neutralized, dried over anhydrous sodium sulfate, filtered, and distilled, yielding an organosiloxane compound (C) shown below as a colorless, clear liquid. It had a refractive index of 1.4185.

Organosiloxane compound (C):

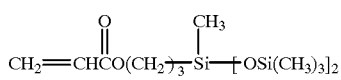

Examples 1–9 and Comparative Examples 1–2

Radiation-curable resin compositions of Examples 1–9 and Comparative Examples 1–2 were prepared by mixing an acryl group-bearing organopolysiloxane, an ethylenically unsaturated group-bearing compound and a photopolymerization initiator as shown in Table 1. The compositions were examined for physical properties by the following tests.

Each resin composition was applied onto a glass plate to a build-up of a thickness of 200 μm. UV radiation having a wavelength of 350 nm was irradiated to the coating in a dose of 500 mJ/cm², obtaining a cured film.

Young's modulus:

After the cured film was conditioned for 24 hours at 25° C. and RH 50%, a 2.5% tensile modulus was measured under conditions: a gage mark distance of 25 mm and a pulling rate of 1 mm/min.

Tensile strength and Elongation at rupture:

After the cured film was conditioned for 24 hours at 25° C. and RH 50%, measurement was made under conditions: a gage mark distance of 25 mm and a pulling rate of 50 mm/min.

With respect to outer appearance, the cured film was visually observed and rated "O" when it was clear and "X" when it was white, opaque and delaminated.

TABLE 1

| Composition (parts by weight) | Example | | | | | | | | | Comparative Example | |
|---|---|---|---|---|---|---|---|---|---|---|---|
| | 1 | 2 | 3 | 4 | 5 | 6 | 7 | 8 | 9 | 1 | 2 |
| Acryl-bearing organopolysiloxane (A) | 70 | 70 | 80 | 70 | 70 | 70 | 70 | 70 | 80 | — | — |
| Acryl-bearing organopolysiloxane (B) | — | — | — | — | — | — | — | — | — | 70 | 70 |
| Ethylenically unsaturated group-bearing compound | | | | | | | | | | | |
|   Nonylphenyl-polyethylene glycol-acrylate*1 | — | 20 | 12 | 18 | 20 | — | — | 15 | — | — | 20 |
|   Nonylphenyl-polypropylene glycol-acrylate*2 | 20 | — | — | — | — | 20 | — | — | — | 20 | — |
|   Methyltri-ethylene glycol acrylate | 10 | 10 | — | — | — | — | 15 | — | — | 10 | — |
|   Isooctyl acrylate | — | — | 5 | 7 | — | — | 5 | — | — | — | 10 |
|   Isobornyl acrylate | — | — | 3 | 5 | — | — | — | 5 | — | — | — |
|   N-vinyl caprolactam | — | — | — | — | 10 | 10 | 10 | 10 | 20 | — | — |
| Organosiloxane compound (C) | | | | | | | | | | | |
| Photopolymerization initiator*3 | 3 | 3 | 3 | 3 | 3 | 3 | 3 | 3 | 3 | 3 | 3 |
| Properties | | | | | | | | | | | |
| Outer appearance | ○ | ○ | ○ | ○ | ○ | ○ | ○ | ○ | ○ | X | X |
| Viscosity (centipoise, 25° C.) | 1360 | 960 | 2100 | 1500 | 1550 | 1510 | 1260 | 1210 | 1210 | UM | UM |
| Refractive index $n_D^{25}$ | 1.4841 | 1.4822 | 1.4870 | 1.4879 | 1.4823 | 1.4811 | 1.4801 | 1.4819 | 1.4714 | | |
| Young's modulus (kgf/mm²) at 25° C. | 0.036 | 0.034 | 0.030 | 0.035 | 0.028 | 0.030 | 0.027 | 0.029 | 0.024 | | |
| at −40° C. | 0.046 | 0.15 | 0.10 | 0.17 | 0.039 | 0.037 | 0.059 | 0.067 | 0.034 | | |
| Elongation at rupture (%) | 168 | 238 | 178 | 175 | 212 | 228 | 195 | 215 | 230 | | |
| Tensile strength (kgf/mm²) | 0.034 | 0.037 | 0.031 | 0.040 | 0.043 | 0.063 | 0.031 | 0.036 | 0.036 | | |

*1 Aronix M-113 (Toa Synthetic Industry K.K.)
*2 Aronix M-117 (Toa Synthetic Industry K.K.)
*3 Irgacure 1700 (Chiba Speciality Chemicals K.K.)

The cured films of Comparative Examples 1 and 2 were white, opaque and delaminated and their physical properties were unmeasurable ("UM" in Table 1).

There has been described a low-viscosity radiation-curable liquid resin composition which cures into a product having a low Young's modulus and experiencing a less change of Young's modulus at low temperatures. The composition is useful as a primary coating for optical fibers.

Japanese Patent Application No. 10-208656 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A radiation-curable liquid resin composition comprising
   (A) an organopolysiloxane having a (meth)acryl group at either end of its molecular chain, containing at least 15 mol % of aromatic hydrocarbon groups based on the entire organic groups attached to silicon atoms, and being free of an urethane bond within the molecule,
   (B) a compound having at least one ethylenically unsaturated group in a molecule, and
   (C) a photopolymerization catalyst.

2. The composition of claim 1 wherein the organopolysiloxane of component (A) is a linear diorganopolysiloxane having (meth)acryloxyalkyl groups at both ends of the molecular chain.

3. The composition of claim 1 wherein the organopolysiloxane of component (A) is of the following formula (1):

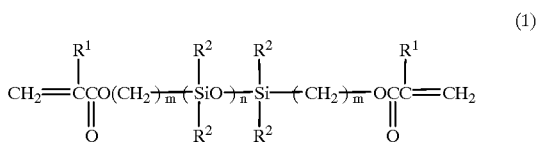

wherein $R^1$ is a hydrogen atom or a methyl group, $R^2$ is independently a substituted or unsubstituted monovalent hydrocarbon group having 1 to 10 carbon atoms, $R^2$ contains at least 15 mol % of aromatic hydrocarbon groups, m is an integer of 1 to 5, and n is an integer of 80 to 1,200.

4. The composition of claim 1 wherein the compound having at least one ethylenically unsaturated group in a molecule of component (B) is an organic silicon compound of the following formula (2):

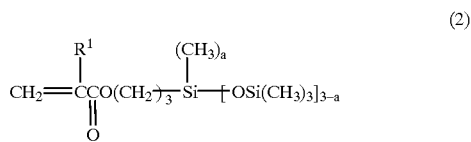

wherein $R^1$ is a hydrogen atom or a methyl group, and a is equal to 0 or 1.

5. The composition of claim 1 for use in the coating of optical fibers.

6. An optical fiber covered with a cured product of the composition of claim 1.

* * * * *